Figure 1:
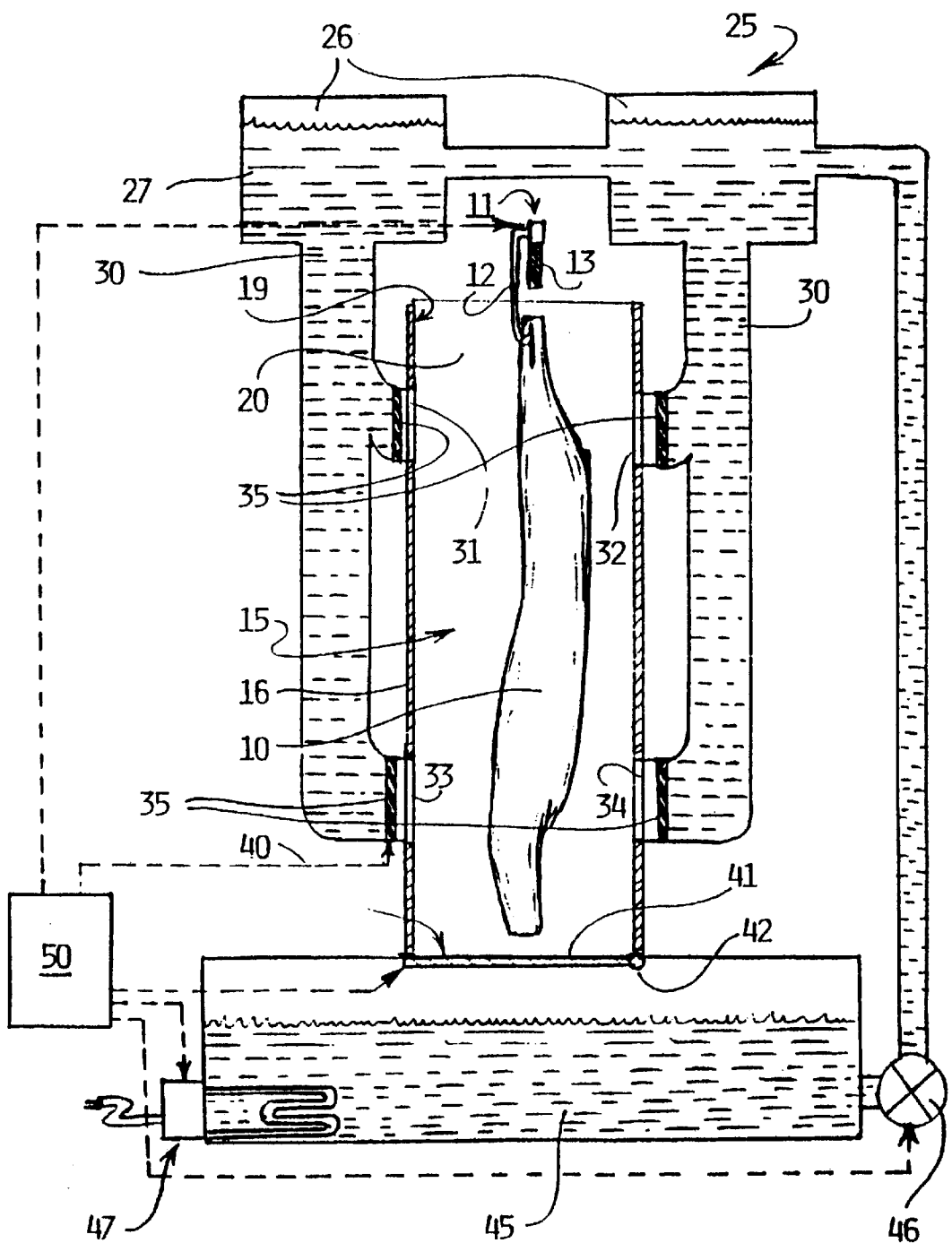

United States Patent
Buhot et al.

[11] Patent Number: 6,142,861
[45] Date of Patent: Nov. 7, 2000

[54] MEAT DECONTAMINATION

[75] Inventors: John Buhot, Coorparoo; Paul Stapleton, Indooroopilly; Paul Green, Carina; Paul Anderson, Camp Hill, all of Australia

[73] Assignee: Commonwealth Scientific and Industrial Research Organisation, Campbell, Australia

[21] Appl. No.: 09/155,563

[22] PCT Filed: Jan. 30, 1998

[86] PCT No.: PCT/AU98/00053

§ 371 Date: Sep. 30, 1998

§ 102(e) Date: Sep. 30, 1998

[87] PCT Pub. No.: WO98/33390

PCT Pub. Date: Aug. 6, 1998

[30] Foreign Application Priority Data

Jan. 31, 1997 [AU] Australia ................... PO4893

[51] Int. Cl.[7] .............................. A22C 17/08
[52] U.S. Cl. ............................ 452/78; 452/173
[58] Field of Search ..................... 452/173, 123, 452/74, 78, 77

[56] References Cited

U.S. PATENT DOCUMENTS

| | | | |
|---|---|---|---|
| 2,549,070 | 4/1951 | Drews | 452/72 |
| 2,649,615 | 8/1953 | Sharp | 452/80 |
| 3,523,326 | 8/1970 | Ambil | 452/77 |
| 4,279,059 | 7/1981 | Anderson et al. | |
| 4,337,549 | 7/1982 | Anderson et al. | |
| 4,407,036 | 10/1983 | Kuhl | |
| 4,965,911 | 10/1990 | Davey | 452/77 |
| 5,045,021 | 9/1991 | Borup | 452/74 |
| 5,232,394 | 8/1993 | Conell, III et al. | 452/74 |
| 5,651,730 | 7/1997 | McGinnis et al. | 452/77 |
| 5,938,519 | 8/1999 | Wright | 452/173 |

FOREIGN PATENT DOCUMENTS

| | | |
|---|---|---|
| 71412/87 | 10/1988 | Australia . |
| 0 181 046 | 5/1986 | European Pat. Off. . |
| 0 584 955 | 3/1994 | European Pat. Off. . |
| WO 91/06219 | 5/1991 | WIPO . |

Primary Examiner—Willis Little
Attorney, Agent, or Firm—McDermott, Will & Emery

[57] ABSTRACT

The invention relates to decontaminating meat by locating a body of meat (10) within a chamber (15), providing a volume (25) of decontaminating water (27) sufficient to fill the chamber (15) and immerse the body of meat; supplying the decontaminating water (27) at e.g. 80° C. to the chamber at multiple inlet point (31–34) accompanied by substantial turbulence as it fills the chamber (15) and discharging the decontaminating water from the chamber (15) after the body of meat (10) has been decontaminated (e.g. after ten seconds). The volume of decontaminating water (27) is provided in an elevated vessel (26) connected to the chamber (15) through a supply passage (30) of relatively large flow area. The body of meat (10) is suspended from an overhead conveyor (11) and is conveyed into the chamber (15) through an entry opening and out of the chamber (15) through an exit opening, the body of meat (10) being paused in its movement by the conveyor (11) when it has entered the chamber (15) to enable the decontaminating operation to take place.

12 Claims, 2 Drawing Sheets

MEAT DECONTAMINATION

This invention relates to a process and apparatus for decontamination of meat.

After a carcass of a slaughtered animal has passed through a number of physical processing stages in an abattoir, such as head removal, hide or pelt removal, evisceration, and carcass splitting, the carcass is usually moved to a chiller or cool room for temporary or medium term storage. Although processes and operations are carried out in a manner to minimise bacterial contamination, nevertheless the considerable handling and processing does result in surface contamination by micro-organisms from airborne micro-organisms and from contact with human operators, with other carcasses, and with apparatus. Hence, before taking a carcass to the storage facility, the carcass is decontaminated.

In the past, decontamination of carcasses has been carried out by a washing operation. For example, the carcass can pass by an installation where fixed sprays are located, the carcass being sprayed with a washing solution, such as an acetic acid solution, chlorine solution, or solution of other disinfectant or anti-microbial agent. Another known system, instead of using sprays of a decontaminating solution, uses a flume or curtain of falling solution through which the carcass passes so that the solution runs down and washes the surface of the carcass. It has also been proposed to use nozzles to direct steam at the carcass to contact and decontaminate the surface, or to enclose the carcass in a steam cabinet.

The known decontamination systems can suffer from a number of disadvantages. In particular, it can be difficult to design and construct installations where the treatment solution or steam contacts substantially the entire surface area of the carcass. This can result in significant areas of a carcass potentially contaminated with micro-organisms not being effectively decontaminated. Also, the use of solutions of anti-microbial agents can have particular problems, e.g. an acetic acid solution causes corrosion problems with metal components that can be contacted by the solution. Chemical tainting of carcasses can also be a potential problem. Steam decontamination can cause safety hazards for human operators.

It is an object of the present invention to provide a process and apparatus for decontamination of meat which is effective in operation.

It is a preferred object of the present invention to provide a process and apparatus for decontamination of meat which can alleviate some or all of the problems with prior decontamination systems outlined above.

According to the present invention there is provided a process of decontaminating meat including the steps of:
  locating a body of meat within a chamber;
  providing a volume of decontaminating water sufficient to fill the chamber to a level sufficient to immerse the body of meat;
  selectively supplying the decontaminating water to the chamber so that the decontaminating water rapidly enters the chamber to immerse the meat, creating substantial turbulence in the decontaminating water as it fills the chamber; and
  discharging the decontaminating water from the chamber after the body of meat has been decontaminated.

By rapidly introducing into the chamber a volume of liquid sufficient to totally immerse the body of meat, there is substantial turbulence created in the decontaminating water entering the chamber. The turbulence of the water and bubbles in the water promotes effective contact between the decontaminating water and the surface area of the body of meat so that the decontaminating action of the water can be effectively achieved over the entire surface area. This action includes the physical removal of micro-organisms from the surface and collection in the water.

The volume of decontaminating water may be provided in a vessel in an elevated position relative to the chamber, the vessel being connected to the chamber through a supply passage of relatively large flow area so that the, volume of decontaminating water can flow quickly from the vessel into the chamber. The body of meat is preferably suspended from an overhead conveyor and is conveyed into the chamber through an entry opening and out of the chamber through an exit opening by movement of the body of meat along the conveyor, the body of meat being paused in its movement by the conveyor when it has entered the chamber through the entry opening to enable the decontaminating operation to take place and subsequently the movement by the conveyor being resumed to move the body of meat out through the exit opening.

It has been found that it is effective to use decontaminating water at a temperature of about 80° C. with the body of meat is immersed in the heated water for about 10 seconds or more, and these process parameters are preferred.

The present invention also provides an apparatus for decontamination of meat including:
  a chamber in which a body of meat is located;
  a supply which holds a volume of decontaminating water at least sufficient to fill the chamber to a level sufficient to immerse the body of meat;
  valve means which is selectively operable to connect the supply to the chamber so that the decontaminating water rapidly enters the chamber to immerse the body of meat, creating substantial turbulence upon entering the chamber; and
  a discharge selectively openable to empty the chamber after the body of meat has been decontaminated.

In the preferred embodiment, the chamber includes a cabinet having an entry opening and an exit opening through which the body of meat is conveyed into and out of the chamber, the entry opening and exit opening having respective associated closures which are closed when the decontaminating operation is taking place and which are opened respectively to allow the body of meat to be conveyed into and to be conveyed out of the cabinet. The apparatus preferably further includes an overhead conveyor from which the body of meat is suspended, the overhead conveyor being operative to convey the body of meat through the entry opening prior to the decontaminating operation and to convey the body of meat out through the exit opening after completion of the decontaminating operation in the cabinet. The conveyor preferably has associated means operative to stop or pause the movement of the body of meat within the cabinet to enable the decontaminating operation within the cabinet to take place, and to resume movement of the body of meat after the decontaminating operation.

The supply may include an elevated vessel in which there is stored a volume of decontaminating water at least sufficient to fill the chamber to a level to immerse the body of meat and a supply passage extending from the vessel to the chamber, the supply passage having a substantial cross-sectional flow area so that the volume of decontaminating water can flow quickly from the vessel into the chamber. The supply passage from the vessel to the chamber preferably opens into the chamber at a number of points within the chamber so as to introduce the water at different heights and/or from different directions so as to thereby enhance the turbulence created as the water is introduced.

The discharge may include a discharge located in the floor of the chamber so that at the end of the decontaminating operation, the water in the chamber can be dumped rapidly out through the bottom of the chamber.

The apparatus preferably further includes heating means to heat the decontaminating water to a predetermined temperature, and a control means to control the decontaminating operation including control of the entry into and exit from the chamber of the body of meat, the heating of the water to the predetermined temperature, the opening of the valve means to connect the supply to the chamber, and the opening of the discharge to empty the chamber at the end of the decontaminating operation.

Figure 2:
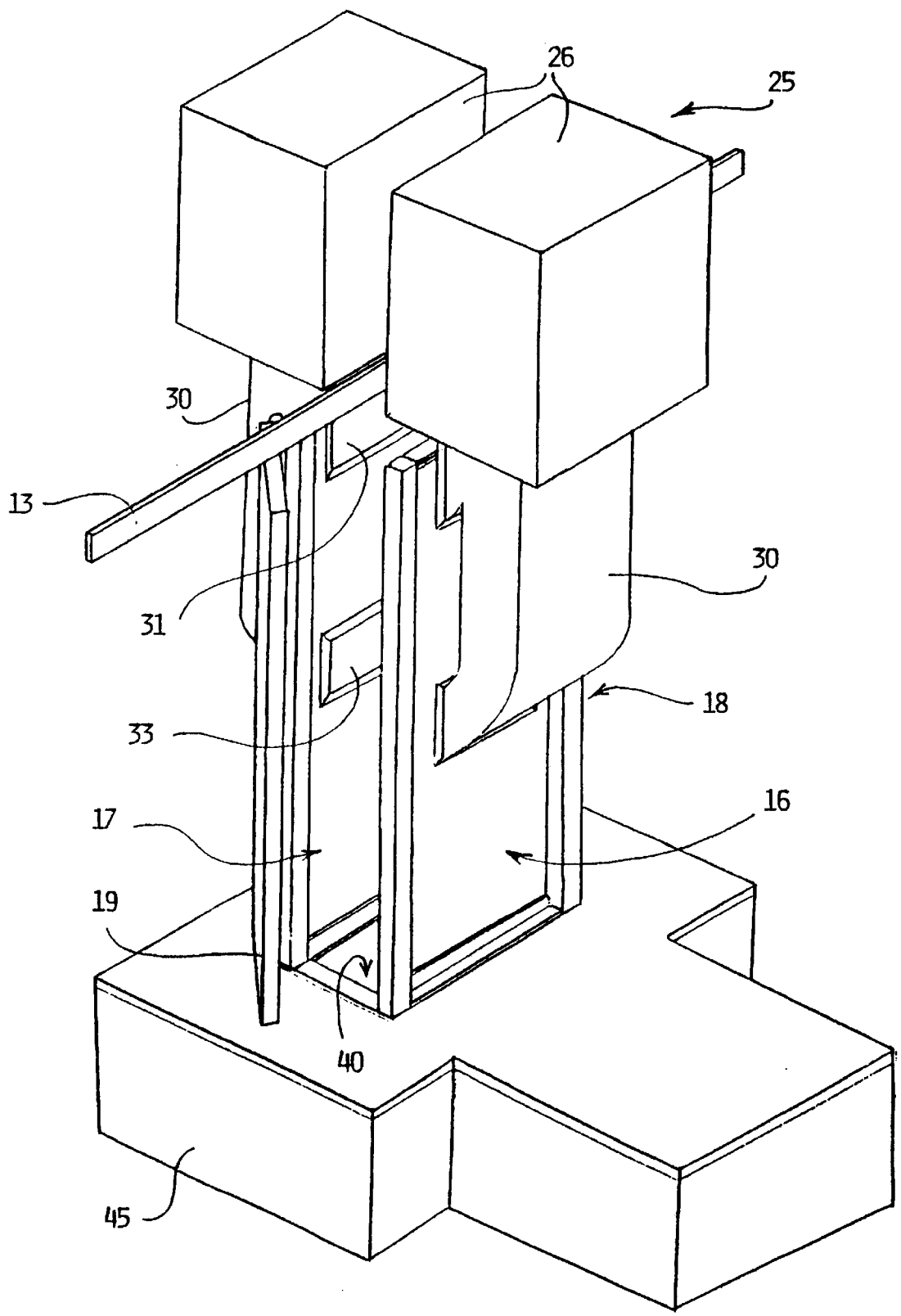

Possible and preferred features of the present invention will now be described with particular reference to the accompanying drawings. However it is to be understood that the features illustrated in and described with reference to the drawings are not to be construed as limiting on the scope of the invention. In the drawings:

FIG. 1 is a schematic sectional elevation of an apparatus according to one possible embodiment of the present invention; and FIG. 2 is a outside perspective view of the apparatus shown in FIG. 1.

The illustrated apparatus shows a body of meat 10 namely a side of beef suspended from an overhead conveyor 11. The apparatus has been particularly designed and developed for beef carcasses but is useable with other species such as ovine carcasses and with other meat portions.

The apparatus includes a chamber 15 defined by a cabinet 16 having entry and exit openings 17, 18 through which the body of meat 10 is conveyed into and out of the chamber 15. The entry and exit openings 17, 18 have respective associated closures 19, 20 which are closed when the decontaminating operation is taking place but which are opened respectively to allow the body of meat 10 to enter into and exit from the cabinet 15. The body of meat 10 may for example comprise a carcass (which expression includes a side of an entire carcass of a slaughtered animal, a forequarter, hindquarter, or other portion or body of meat) which can be suspended from the overhead conveyor 11 in a conventional manner using hook 12 movable along tail 13. The entry and exit openings 17, 18 are provided in respective opposite side walls of the cabinet 15 in the path of movement of the body of meat 10 determined by the conveyor 11.

The apparatus includes a supply 25 including a header vessel 26 in which the volume of decontaminating water 27 at least sufficient to fill the chamber 15 to a level to immerse the meat is stored. Supply passage 30, shown as ducts or pipes, extends from the header vessel 26 to the chamber 15, opening into the chamber at a number of points 31, 32, 33, 34 to introduce the water at different heights and from various directions, thereby enhancing the turbulence created as the water is introduced. The supply ducts 30 are of substantial cross sectional area so that the volume of decontaminating water can flow quickly from the header vessel 26 through the ducts into the chamber 15 when the valve means 35 is opened. The valve means 35 preferably comprise rapidly opening valves which can open the supply ducts 30 or supply ports 31–34 into the chamber 15 to allow rapid flow therethrough, suitable valves being sliding or hinged or pivoted valve plates.

A discharge 40 is selectively openable to empty the chamber 15. The illustrated discharge 40 is located in the floor 41 of the chamber 1 S. In the illustrated embodiment, the floor 14 itself is hinged along one edge 42 and can be dropped away from its normally horizontal position in which it closes the bottom of the chamber 15 thereby dumping the water from the chamber rapidly out through the bottom, e.g. into a bottom collection tank 45 located beneath the chamber. The bottom collection tank 45 can Function as a storage for decontaminating water, the apparatus also including pump means 46 to raise the water from the bottom collection and storage tank 45 to the header vessel 26.

If desired the decontaminating water 27 after discharge can be recycled. This can include filtering to remove particulate impurities or contaminants as well as chemical and/or biological treatment to make the recycled water suitable for reuse in a subsequent decontaminating operation.

The decontaminating water 27 may incorporate disinfectant or anti-microbial agents such as chemical additives of the kinds used in the past. However it has been found that addition of anti-microbial agents need not be necessary if the water is heated to a suitable temperature for effecting bacteriological decontamination. For example, the water may be heated to a temperature of about 80° C. and the chamber 15 containing the body of meat 10 filled with water at this temperature.

The period of time that a body of meat is immersed in decontaminating water can also influence the effectiveness of the decontaminating operation. It has been found that immersion of a body of meat at 80° C. for about ten seconds is effective to achieve acceptable micro-biological decontamination of a carcass.

Heating means 47 are provided to heat the decontaminating water to a predetermined temperature. A control means 50 controls the decontaminating operation including control of the entry into and exit from the chamber 15 of the body of meat 10, the heating of the water to the predetermined temperature, the opening of the valve means 35 to connect the supply 25 to the chamber, and the opening of the discharge 40 to empty the chamber at the end of the decontaminating operation.

In operation of the apparatus, the carcass side 10 carried by the overhead conveyor 11 can enter the cabinet 16 through the entry opening 17. The conveyor 11 from which the carcass side is suspended can be stopped, or other mechanical systems can be used to pause the carcass in the decontamination cabinet 16 during treatment. The closure 18 associated with the entry opening 17 can be automatically closed, e.g. by sensing the passage of a carcass 10 into the chamber 15. The fill, soak and discharge cycle can then be automatically implemented. The water temperature, and soak time can be programmed and therefore can be variable as desired. As mentioned above, typically the carcass side is immersed for about ten seconds at 80° C. After the decontaminating water is discharged, the closure 20 associated with the exit opening 18 of the cabinet 16 can be opened and the decontaminated carcass 10 can be automatically conveyed out of the cabinet through the exit opening.

It will be seen that the process and apparatus according to the present invention can effectively decontaminate a body of meat located within the chamber. In particular, the rapid dumping of a volume of heated decontaminating water sufficient to fill the chamber to immerse the body of meat creates substantial turbulence in the chamber. The buffeting of the body of meat, the turbulence in the water, including the large quantities of air bubbles violently agitating the water, promote contact of the decontaminating water with the entire surface area of the body of meat, including concavities and crevices. Also, the temperature of the water and the immersion time will result in heating of the entire surface area, even in tiny air filled crevices where the decontaminating water may not have directly contacted, so that micro-organisms on the surface will be exposed to the elevated temperature.

What is claimed is:

1. A process of decontaminating meat including the steps of:

locating a body of meat within a chamber;

providing a volume of decontaminating water sufficient to fill the chamber to a level sufficient to immerse the body of meat;

selectively supplying the decontaminating water to the chamber so that the decontaminating water rapidly enters the chamber to immerse the meat, creating substantial turbulence in the decontaminating water as it fills the chamber; and discharging the decontaminating water from the chamber after the body of meat has been decontaminated.

2. A process as claimed in claim 1 wherein the volume of decontaminating water is provided in a vessel in an elevated position relative to the chamber, the vessel being connected to the chamber through a supply passage of relatively large flow area so that the volume of decontaminating water can flow quickly from the vessel into the chamber.

3. A process as claimed in claim 2 wherein the body of meat is suspended from an overhead conveyor and is conveyed into the chamber through an entry opening and out of the chamber through an exit opening by movement of the body of meat along the conveyor, the body of meat being paused in its movement by the conveyor when it has entered the chamber through the entry opening to enable the decontaminating operation to take place and subsequently the movement by the conveyor being resumed to move the body of meat out through the exit opening.

4. A process as claimed in claim 1, wherein the decontaminating water is at a temperature of about 80° C. and the body of meat is immersed in the heated water for about 10 seconds or more.

5. An apparatus for decontamination of meat including:

a chamber in which a body of meat is located;

a supply which holds a volume of decontaminating water at least sufficient to fill the chamber to a level sufficient to immerse the body of meat;

valve means which is selectively operable to connect the supply to the chamber so that the decontaminating water rapidly enters the chamber to immerse the body of meat, creating substantial turbulence upon entering the chamber; and a discharge selectively openable to empty the chamber after the body of meat has been decontaminated.

6. Apparatus as claimed in claim 5 wherein the chamber includes a cabinet having an entry opening and an exit opening through which the body of meat is conveyed into and out of the chamber, the entry opening and exit opening having respective associated closures which are closed when the decontaminating operation is taking place and which are opened respectively to allow the body of meat to be conveyed into and to be conveyed out of the cabinet.

7. Apparatus as claimed in claim 6 and further including an overhead conveyor from which the body of meat is suspended, the overhead conveyor being operative to convey the body of meat through the entry opening prior to the decontaminating operation and to convey the body of meat out through the exit opening after completion of the decontaminating operation in the cabinet.

8. An apparatus as claimed in claim 7 wherein the conveyor has associated means operative to stop or pause the movement of the body of meat within the cabinet to enable the decontaminating operation within the cabinet to take place, and to resume movement of the body of meat after the decontaminating operation.

9. Apparatus as claimed in claim 5 wherein the supply includes an elevated vessel in which is stored a volume of decontaminating water at least sufficient to fill the chamber to a level sufficient to immerse the body of meat and a supply passage extending from the vessel to the chamber, the supply passage having a substantial cross-sectional flow area so that the volume of decontaminating water can flow quickly from the vessel into the chamber.

10. Apparatus as claimed in claim 9 wherein the supply passage from the vessel to the chamber opens into the chamber at a number of points within the chamber so as to introduce the water at different heights and/or from different directions so as to thereby enhance the turbulence created as the water is introduced.

11. Apparatus as claimed in claim 5 wherein the discharge includes a discharge located in the floor of the chamber so that at the end of the decontaminating operation, the water in the chamber can be dumped rapidly out through the bottom of the chamber.

12. Apparatus as claimed in claim 5 and further including heating means to heat the decontaminating water to a predetermined temperature, and a control means to control the decontaminating operation including control of the entry into and exit from the chamber of the body of meat, the heating of the water to the predetermined temperature, the opening of the valve means to connect the supply to the chamber, and the opening of the discharge to empty the chamber at the end of the decontaminating operation.

\* \* \* \* \*